United States Patent
Kim et al.

(10) Patent No.: US 10,220,827 B2
(45) Date of Patent: Mar. 5, 2019

(54) VEHICLE AND A CONTROL METHOD FOR A VEHICLE

(71) Applicants: HYUNDAI MOTOR COMPANY, Seoul (KR); KIA MOTORS CORPORATION, Seoul (KR)

(72) Inventors: Sang Joon Kim, Seoul (KR); Leehyoung Cho, Suwon-si (KR); Young Chul Kim, Seongnam-si (KR); Dong Ho Yang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/633,600

(22) Filed: Jun. 26, 2017

(65) Prior Publication Data

US 2018/0170348 A1   Jun. 21, 2018

(30) Foreign Application Priority Data

Dec. 15, 2016   (KR) .......................... 10-2016-0171330

(51) Int. Cl.
| | |
|---|---|
| *B60W 20/12* | (2016.01) |
| *B60W 10/18* | (2012.01) |
| *B60W 10/10* | (2012.01) |
| *B60W 50/12* | (2012.01) |
| *B60W 30/14* | (2006.01) |

(52) U.S. Cl.
CPC .......... *B60W 20/12* (2016.01); *B60W 30/143* (2013.01); *B60W 2510/081* (2013.01); *B60W 2550/14* (2013.01)

(58) Field of Classification Search
CPC ...... B60W 20/12; B60W 10/08; B60W 10/18; B60W 10/10; B60W 50/12; B60T 13/662; B60K 31/0066
See application file for complete search history.

(56) References Cited

U.S. PATENT DOCUMENTS

| | | | | |
|---|---|---|---|---|
| 2009/0018744 | A1* | 1/2009 | Abe | B60K 31/0066 701/93 |
| 2010/0009807 | A1* | 1/2010 | Umakoshi | B60T 13/662 477/73 |
| 2016/0304080 | A1* | 10/2016 | Sugiyama | B60W 20/12 |
| 2017/0151960 | A1* | 6/2017 | Fujiki | B60W 10/08 |

* cited by examiner

*Primary Examiner* — Yuri Kan
(74) *Attorney, Agent, or Firm* — Lempia Summerfield Katz LLC

(57) ABSTRACT

A vehicle includes a storage configured to store navigation information, a communication module configured to receive current location information, a power apparatus configured to generate a driving force and to adjust the generated driving force, and a controller configured to acquire, if a cruise control mode is input, information about a location at which an event occurs based on the navigation information, and to control operation of the power apparatus based on the current location information and the information about the location at which the event occurs.

19 Claims, 17 Drawing Sheets

VEHICLE AND A CONTROL METHOD FOR A VEHICLE

CROSS-REFERENCE TO RELATED APPLICATION

This application claims priority to and the benefit of Korean Patent Application No. 10-2016-0171330, filed on Dec. 15, 2016 in the Korean Intellectual Property Office, the disclosure of which is incorporated herein by reference.

BACKGROUND

Field of the Disclosure

Embodiments of the present disclosure relate to a vehicle for controlling a driving force during traveling, and a method of controlling the vehicle.

Description of the Related Art

A vehicle is a mobile machine configured to move on roads via rotating wheels.

Such vehicles include an internal-combustion engine vehicle (a general engine vehicle) of burning oil fuel, such as gasoline and diesel, to generate mechanical power, and traveling using the mechanical power Such vehicles also include an eco-friendly vehicle using electricity as power in order to increase fuel efficiency and reduce harmful gas emissions, and traveling using the electrical power.

The eco-friendly vehicle includes an electric vehicle including a motor and a battery which is a chargeable power source to rotate the motor with electricity accumulated in the battery and to drive wheels using the rotation of the motor. The eco-friendly vehicle also includes a hybrid vehicle including an engine, a battery, and a motor to travel by controlling the mechanical power of the engine and the electrical power of the motor, and a hydrogen fuel cell vehicle.

The hybrid vehicle can travel in an Electric Vehicle (EV) mode using only the power of the motor, or in a Hybrid Electric Vehicle (HEV) mode using both the power of the engine and the power of the motor, and perform a regenerative braking mode of restoring braking and inertial energy through the generation operation of the motor upon braking or coasting by inertia to charge the battery.

The vehicle includes a cruise function to enable the vehicle to travel at a constant speed without a driver's manipulation of pressing the accelerator pedal, while recognizing information of a road ahead using high-priced sensors such as: an ultrasonic sensor, an image sensor, a laser sensor, and a radar sensor.

However, such high-priced sensors increase the manufacturing cost of the vehicle, which puts a cost burden on consumers.

SUMMARY

Therefore, it is an aspect of the present disclosure to provide a vehicle configured to decide a time of coasting based on a driving speed and navigation information to control a driving force based on the decided time of coasting. It is another aspect of the present disclosure to provide a method of controlling such a vehicle.

It is another aspect of the present disclosure to provide a vehicle configured to determine whether to restore speed based on navigation information and a user's input information, and to control a driving force based on the determination on whether to restore speed. It is another aspect of the present disclosure to provide a method of controlling such a vehicle.

It is another aspect of the present disclosure to provide a vehicle configured to determine whether a speed control is impossible, based on a driving speed and navigation information, and to output information for a brake control based on the determination on whether the speed control is impossible. It is another aspect of the present disclosure to provide a method of controlling such a vehicle.

It is another aspect of the present disclosure to provide a vehicle configured to control deceleration using a motor, based on navigation information and based on information about a charged level of a battery. It is another aspect of the present disclosure to provide a method of controlling such a vehicle.

Additional aspects of the disclosure will be set forth in part in the description which follows and, in part, will be obvious from the description, or may be learned by practice of the disclosure.

In accordance with one aspect of the present disclosure, a vehicle includes: a storage configured to store navigation information; a communication module configured to receive current location information; a power apparatus configured to generate a driving force, and to adjust the generated driving force; and a controller configured to acquire, if a cruise control mode is input, information about a location at which an event occurs, based on the navigation information, and to control operation of the power apparatus, based on the current location information and the information about the location at which the event occurs.

The vehicle may further include an input device configured to receive the cruise control mode and target speed information; and a speed sensor configured to detect a driving speed, and to output driving speed information corresponding to the detected driving speed. If the cruise control mode is input, the controller controls operation of the power apparatus based on the driving speed information and the target speed information.

The vehicle may further include a speed sensor configured to detect the driving speed, and to output the driving speed information corresponding to the detected driving speed. If the current location is the location at which the event occurs, the controller checks event information, acquires coasting distance information based on the event information and the driving speed information, and stops operation of the power apparatus based on the acquired coasting distance information to perform coasting.

The event information may include at least one of event type information, event location information, and speed limit information.

The controller may acquire state information of a road between the current location and the event location based on the current location information, the event location information, and the navigation information, and may acquire the coasting distance information based on the state information of the road and the driving speed information.

The state information of the road may include road type information of the road, location information for each road type, and gradient information of the road.

The controller may determine whether the vehicle has passed through the event location based on the current location information and the event location information. The controller may control the output of restoration information for restoring speed if the controller determines that the vehicle has passed through the event location. The controller may also control the power apparatus based on the target speed information and the driving speed information if a restoration command is input.

The controller may determine whether the current location is at a predetermined distance ahead of the event location based on the current location information and the event location information. If the controller determines that the current location is at the predetermined distance ahead of the event location, the controller may control the output of brake information based on the driving speed information and the speed limit information.

The vehicle may further include a display. The power apparatus may comprise an engine configured to drive wheels. The controller may determine whether the driving speed is higher than the speed limit, based on the driving speed information and the speed limit information. The controller may then control the display to display the brake information if the controller determines that the driving speed is higher than the speed limit. The controller may also control the power apparatus to maintain the driving speed if the controller determines that the driving speed is lower than or equal to the speed limit.

The vehicle may further include a charged level detector configured to detect a charged level of a battery, and to output charged level information corresponding to the charged level of the battery. The power apparatus may comprise the battery, and a motor configured to drive wheels using power of the battery. The controller may determine whether the driving speed is higher than the speed limit, based on the driving speed information and the speed limit information. If the controller determines that the driving speed is higher than the speed limit, the controller may control an operation of the motor based on the charged level information of the battery and predetermined charged level information.

The vehicle may further include a display. The controller may determine whether the charged level of the battery is higher than or equal to the predetermined charged level, based on the charged level information of the battery and the predetermined charged level information. If the controller determines that the charged level of the battery is lower than the predetermined charged level, the controller may control the display to display the brake information.

If the controller determines that the driving speed is lower than or equal to the speed limit, the controller may control the power apparatus to maintain the driving speed.

The event information may include at least one of event type information, event location information, and speed limit information. The controller may acquire restoration location information based on the event location information, and may control the output of the restoration information for restoring speed based on the restoration location information.

In accordance with another embodiment in the present disclosure, a method of controlling a vehicle includes (if a cruise control mode is input): checking driving speed information and target speed information; controlling operation of a power apparatus based on the driving speed information and the target speed information so that the vehicle travels at a constant speed; determining whether an event occurs, based on pre-stored navigation information and current location information; and if it is determined that an event occurs, controlling an operation of the power apparatus based on the current location information, the event information of the event, and the driving speed information to perform coasting; and turning on a lamp if the coasting is performed.

The event information may include at least one of event type information, event location information, and speed limit information. The performing of the coasting comprises: acquiring coasting distance information based on the event location information and the driving speed information, acquiring start location information of the coasting based on the coasting distance information and the event location information, and controlling the coasting based on the start location information of the coasting.

The performing of the coasting may further comprise acquiring state information of a road between a current location and a location of an event based on the navigation information, and acquiring coasting distance information based on the state information of the road and the driving speed information. The state information of the road may include road type information of the road, location information for each road type, and gradient information of the road.

The method may further include acquiring restoration location information based on the event location information and controlling the output of restoration information for restoring speed based on the restoration location information.

The method may further include: acquiring speed detection location information based on the event location information; controlling detection of driving speed information based on the speed detection location information and the current location information; determining whether the driving speed is higher than the speed limit, based on the driving speed information and the speed limit information; displaying brake information on a display, if it is determined that the driving speed is higher than the speed limit; and controlling the power apparatus to maintain the driving speed, if the driving speed is lower than or equal to the speed limit.

The displaying of the brake information on the display may include: determining whether a charged level of a battery is higher than or equal to a predetermined charged level, based on the charged level information of the battery and the predetermined charged level information, if it is determined that the driving speed is higher than the speed limit; performing deceleration control using a motor connected to wheels, if it is determined that the charged level of the battery is higher than or equal to the predetermined charged level; and displaying the brake information on the display, if it is determined that the charged level of the battery is lower than the predetermined charged level.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the present disclosure is described in detail with reference to the accompanying drawings.

Figure 1:
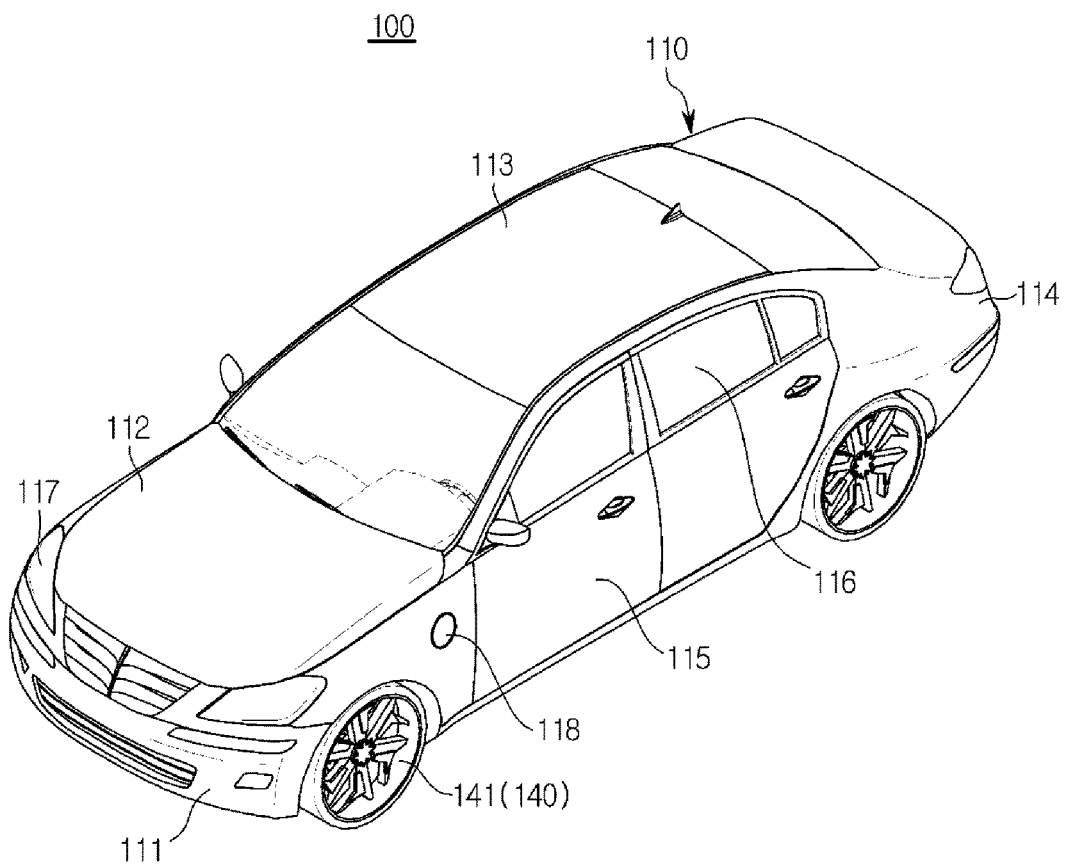
FIG. 1 shows the outer appearance of a vehicle according to an embodiment of the present disclosure.
Figure 2:
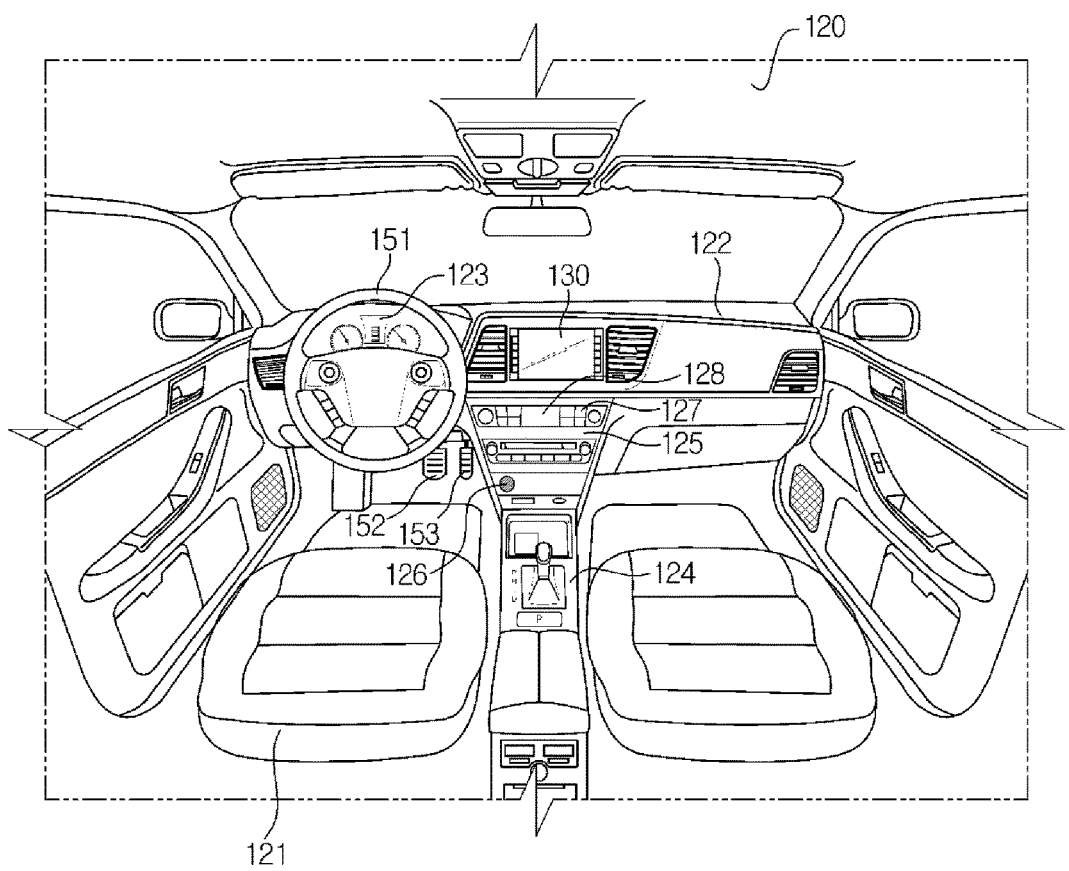
FIG. 2 shows the interior of the vehicle of FIG. 1 according to the embodiment of the present disclosure.
Figure 3:
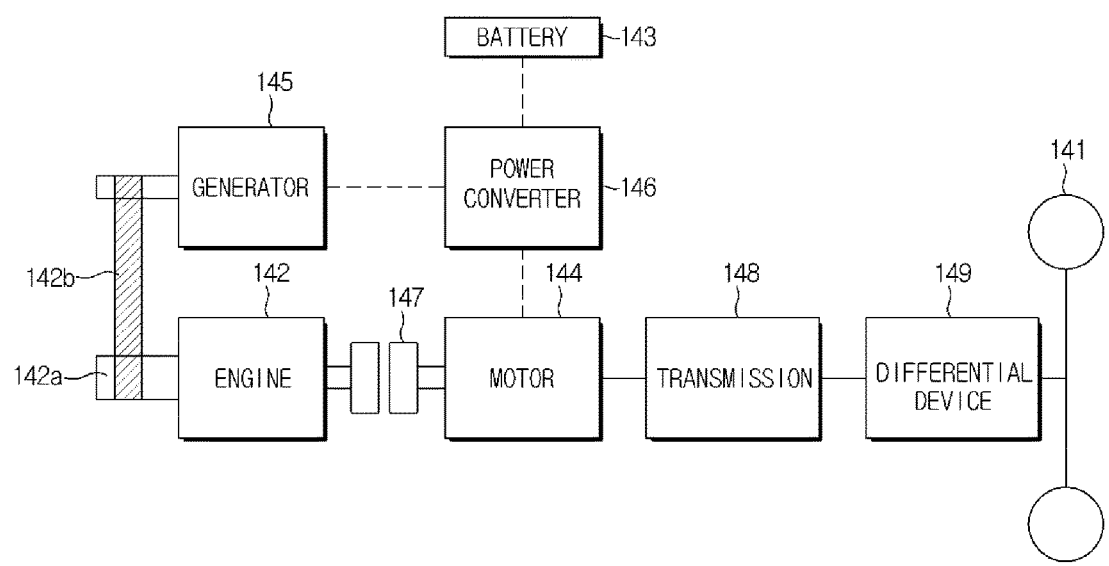
FIG. 3 is a block diagram showing an example of a power apparatus in a chassis included in the vehicle of FIG. 1 according to the embodiment of the present disclosure.

FIG. 1 shows the outer appearance of a vehicle according to an embodiment of the present disclosure. FIG. 2 shows the interior of the vehicle of FIG. 1 according to the embodiment of the present disclosure. FIG. 3 is a block diagram showing an example a power apparatus in a chassis included in the vehicle of FIG. 1 according to the embodiment of the present disclosure.

Herein, the vehicle may be any one of an internal-combustion engine vehicle (a general engine vehicle) of burning oil fuel, such as gasoline or diesel, to generate mechanical power, and traveling using the mechanical power, an electric vehicle including a motor and a battery which is a chargeable power source to rotate the motor using electricity accumulated in the battery and to drive wheels using the rotation of the motor, a hybrid vehicle including an engine, a battery, and a motor to control the mechanical power of the engine and the electrical power of the motor, thereby travelling, and a hydrogen fuel cell vehicle that uses the reaction of hydrogen with oxygen in air to charge the battery using electricity generated by this reaction, and to rotate the motor using the power of the charged battery, thereby traveling.

In the current embodiment, the vehicle is assumed as a hybrid vehicle.

Referring to FIGS. 1 and 2, a vehicle 100 may include a body having an exterior 110 and an interior 120, and a chassis 140, which corresponds to the remaining portion of the vehicle 100 except for the body, and in which mechanical components required for driving are installed.

As shown in FIG. 1, the exterior 110 of the body may include a front panel 111, a hood 112, a loop panel 113, a rear panel 114, front, rear, left and right doors 115, and a plurality of window glass panels 116 respectively installed in the front, rear, left, and right doors 115 in such a way to be able to open or close.

Also, the exterior 110 of the body may include a plurality of fillers, i.e., pillars, provided at the borders between the front, rear, left, and right doors 115 and the window glass panels 116, a plurality of side-view mirrors to provide a driver with the rear view of the vehicle 100, and headlamps and other lamps or lights 117 to enable the driver to easily see information of surroundings while keeping his/her eyes forward, and to perform a function of signaling or communicating with other vehicles and pedestrians.

The lamps 117 may be positioned in the front and rear portions of the exterior 110 of the vehicle 100, and perform a function of signaling or communicating with other vehicles and pedestrians, as well as a lighting function.

The lamps 117 may include an illuminating lamp to illuminate a long distance, a short distance, and the rear direction, may include a signal lamp to inform of a braking action, a turning direction, and an emergency situation, and may include a display lamp to display the width of the vehicle 100, the height of the body, license plate lighting, and parking.

The lamps 117 positioned in the front portion of the exterior 110 of the vehicle 100 may include head lamps including high beams and low beams, fog lamps, side lamps, turn signal lamps, and an emergency lamp.

The lamps 117 positioned in the rear portion of the exterior 110 of the vehicle 100 may include side lamps to display the boundaries of the width of the vehicle 100, turn signal lamps, tail lamps, brake lamps, a backup lamp, an emergency lamp, and a license plate lamp.

As shown in FIG. 2, the interior 120 of the body may include a seat 121 on which a passenger sits, a dashboard 122, and an instrument panel (i.e., an instrument cluster 123) which is disposed on the dashboard 122. The dashboard panel 122 may generally include a tachometer, a speedometer, a coolant temperature sensor, a fuel gauge, a turn signal indicator, a high beam indicator light, a warning light, a seatbelt warning light, a trochometer, an odometer, a shift lever indicator light, a door open warning light, an engine oil warning light, a low fuel warning light, and the like. The interior 120 may also include a center fascia 124 in which the vent and the control plate of an air conditioner are disposed, a head unit 125 disposed in the center fascia 124 to receive commands for operating an audio system and an air conditioner, and a starter 126 disposed in the center fascia 124 to receive a start command.

The vehicle 100 may further include a shift lever disposed in the center fascia 124 to receive a manipulation location, and a parking button (i.e., an Electric Parking Brake (EPB) button) disposed around the shift lever or in the head unit 125 to receive an operation command for an EPB apparatus (not shown).

The vehicle 100 may further include an input device 127 to receive operation commands for various functions.

The input device 127 may be disposed in the head unit 125 and the center fascia 124, and may include at least one physical button, such as on/off buttons for executing or stopping various functions, buttons for changing setting values of the various functions, and the like.

The input device 127 may further include a jog dial (not shown) or a touch pad (not shown) to enable a user to input commands for moving or selecting a cursor displayed on the display of a user interface 130.

The jog dial or the touch pad may be disposed in the center fascia 124, or the like.

The vehicle 100 may further include a display 128 disposed in the head unit 125. The display may be configured to display information about a function being performed by the vehicle 100 and information input by the user.

The vehicle 100 may further include a user interface 130 for the user's convenience.

The user interface 130 may be embedded into or fixed on the dashboard 122.

The user interface 130 may include a display panel as a display, and a touch panel as an input device.

In other words, the user interface 130 may include only a display panel, or may include a touch screen into which a display panel and a touch panel are integrated.

If the user interface 130 is implemented with only a display panel, the user interface 130 may receive selections of buttons displayed on the display panel through the input device 127 provided in the center fascia 124.

If the user interface 130 is implemented with a touch screen, the user interface 130 may receive operation commands from the user through the touch panel.

The user interface 130 may perform an audio function, a video function, a navigation function, a broadcasting (Digital Multimedia Broadcasting (DMB)) function, and a radio function, and may display navigation images and road modeling images in a cruise control mode.

The user interface 130 may display information about a function being executed, and information input by a user.

In order to distinguish the input device 127 and the display 128 provided in at least one of the center fascia 124 and the head unit 125 from the input device and the display provided in the user interface 130, the input device 127 and the display 128 will be referred to as a first input 127 and a first display 128. The input device and the display provided in the user interface 130 will be referred to as a second input and a second display.

Referring to FIGS. 1-3, the chassis 140 of the vehicle 100 may be a frame supporting the exterior 110 and interior 120 of the body, and may include wheels 141 disposed to the front, rear, left, and right of the body, a power apparatus 142 to 149 to apply a driving force to the front, rear, left, and right wheels 141, a steering apparatus, a brake apparatus to apply a brake force to the front, rear, left, and right wheels 141, and a suspension apparatus.

The power apparatus may generate a driving force required for driving the vehicle 100, and adjust the generated driving force. The power apparatus may include a power generating device and a power transferring device.

Figure 4:
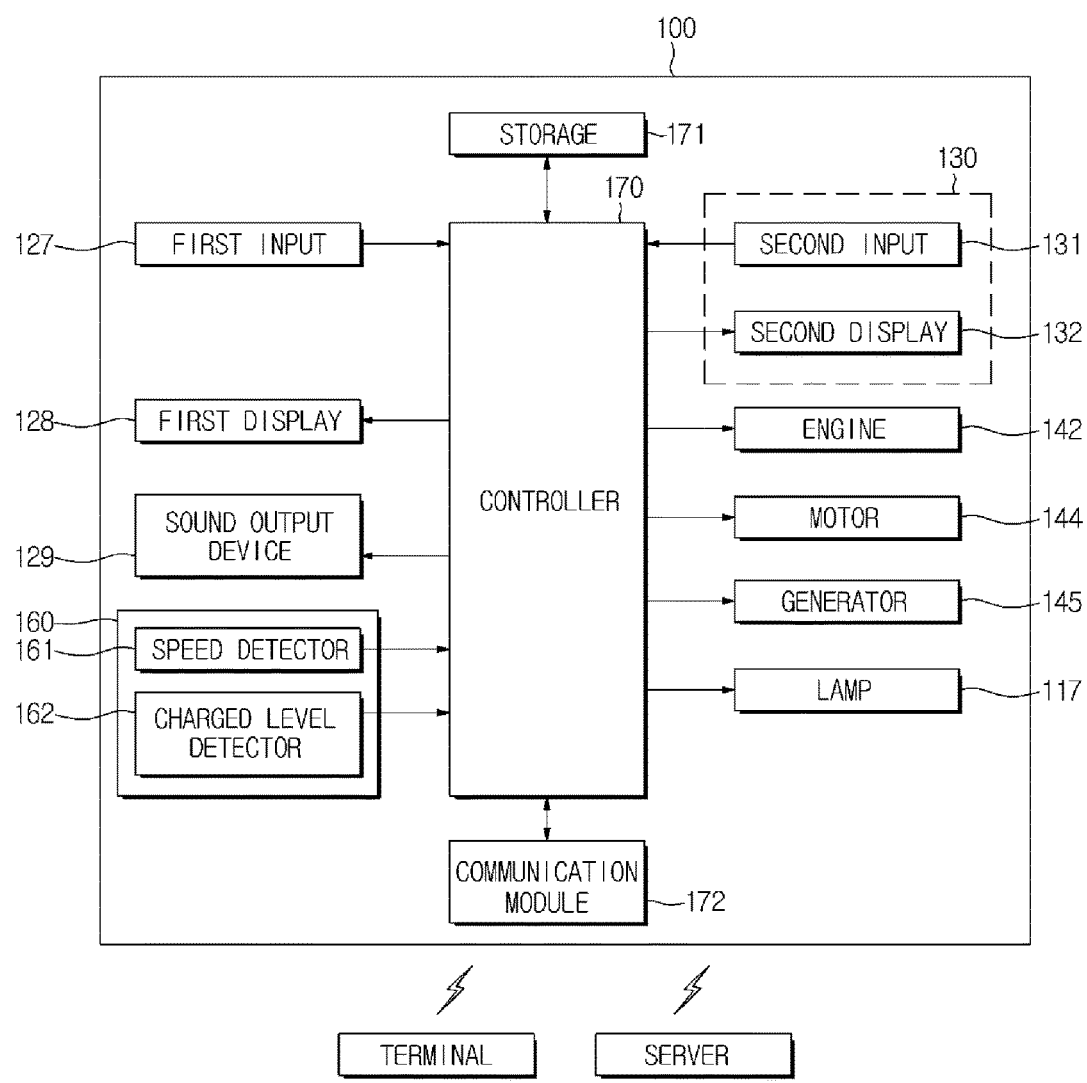
FIG. 4 is a control block diagram of a vehicle according to an embodiment of the present disclosure.

As shown in FIGS. 3 and 4, the power generating apparatus may include an engine 142, a fuel supplier (not shown), a cooler (not shown), an oil supplier (not shown), a battery 143, a motor 144, a generator 145, and a power converter 146.

The power transferring apparatus may include at least one of a clutch 147, a transmission 148, a final reduction device, a differential device 149, and a vehicle shaft.

The engine 142 may burn oil fuel, such as gasoline and diesel, to generate mechanical power.

The battery 143 may generate power of high-voltage current, and supply the generated power to the motor 144.

The battery 143 may receive power supplied from the generator 145 to perform charging.

The motor 144 may convert electrical energy stored in the battery 143 into mechanical energy for operating various components installed in the vehicle 100.

The generator 145, which is a starter generator, may be connected to a crank shaft 142a of the engine 142 through a belt 142b, and interwork with the crank shaft 142a of the engine 142 to operate as a motor when the engine 142 starts, and to charge the battery 143 when the engine 142 is not used to drive the wheels 141.

In other words, the generator 145 may operate as a generator by the power of the engine 142, or may operate as a generator by power transferred through the engine 142 in an energy regeneration condition by braking, deceleration, or low-speed driving to charge the battery 143.

Also, the vehicle 100 may receive power from a charger disposed in a parking lot or a charging station, and charge the battery 143 using the received power.

The power converter 146 may convert power of the battery 143 into driving power of the motor 144, or power generated by the generator 145 into power that can be charged in the battery 143.

Also, the power converter 146 may convert power of the battery 143 into driving power of the generator 145.

Also, the power converter 146 may include an inverter and a converter.

The power converter 146 may change the direction and output of current between the motor 144 and the battery 143.

The clutch 147 may be closed when a driving force is generated only by the engine 142, and opened when a driving force is generated using the power of the battery 143.

For example, the clutch 147 may be opened when deceleration driving or low-speed driving is performed using the motor 144 and when braking is performed. The clutch 147 may be closed when acceleration driving or cruise control at a speed which is higher than a predetermined speed is performed.

The transmission 148 may transfer the rotation motions of the engine 142 and the motor 144 to the wheels 141.

The differential device 149 may be disposed between the transmission 148 and the wheels 141. The differential device 149 may adjust a transmission ratio of the transmission 148 to generate a driving force for the left and right wheels 141 and transfer the generated driving force to the left and right wheels 141.

The vehicle 100 may further include an auxiliary battery (not shown) configured to generate low-voltage current, and electrically connected to the audio system, indoor lamps, and other electronic components to supply the low-voltage current as driving power to the audio system, the indoor lamps, and the other components. The auxiliary battery may be charged by the battery 143.

The vehicle 100 may include a steering wheel 151 of the steering apparatus for controlling the driving direction, a brake pedal 152 that is pressed by the user according to the user's brake intention, and an accelerator pedal 153 that is pressed by the user according to the user's acceleration intention (see FIG. 2).

The current embodiment relates to the configuration of a hybrid vehicle.

The configurations of an internal-combustion engine vehicle, an electric vehicle, and a hydrogen fuel cell vehicle are nearly similar to that of the hybrid vehicle, except for the configuration of the power apparatus of the chassis.

The internal-combustion engine vehicle may include, as a power apparatus, an engine, a fuel supplier, a cooler, an oil supplier, a starter motor, a clutch, a transmission, a final reduction device, a differential device, and a vehicle shaft.

Also, the electric vehicle may include, as a power apparatus, a battery, a motor, a generator, a power converter, a transmission, a final reduction device, a differential device, and a vehicle shaft.

FIG. 4 is a control block diagram of a vehicle according to an embodiment of the present disclosure. The following description is given by referring to FIGS. 1, 3, 4, 5A, 5B, and 6 together.

The vehicle 100 may include the first input 127, the first display 128, a sound output device 129, the user interface 130, the engine 142, the battery 143, the motor 144, the generator 145, the clutch 147, the lamp 117, a detector 160, a controller 170, a storage 171, and a communication module 172.

The first input 127 may receive a normal driving mode and a cruise control mode.

In the cruise control mode, the first input 127 may receive a target speed, or a restoration command for restoring the target speed.

The first input 127 may include a button, a switch, or a key for receiving a driving mode and a restoration command.

The first display 128 may display a driving mode, a target speed, and a message inquiring about whether to restore speed.

The first display 128 may display information informing that a speed control is impossible.

The first display 128 may display event information and a current driving speed.

The event information may include speed limit information, information about the locations of speed cameras, information about the locations of sharp curves, information about the locations of steeply descending roads, information about the locations of children protection zones, information about the locations of speed bumps, and information about the locations of tollgates.

Also, the first display 128 may be a display provided in the head unit 125, or a display (not shown) provided in the cluster 123.

The sound output device 129 may output, as sound, navigation information corresponding to a navigation function.

Herein, the navigation information may include route guidance information and event information.

The sound output device 129 may output, as sound, audio information corresponding to image information displayed on the user interface 130.

The sound output device 129 may output, as sound, information informing that a speed control is impossible.

Also, the sound output device 129 may output a message inquiring about whether to restore speed, as sound.

The sound output device 129 may be a speaker provided in the vehicle 100, or a speaker provided in the user interface 130.

The user interface 130 may output route guidance information based on current location information and the navigation information.

More specifically, if the navigation function is selected in the normal driving mode, the user interface 130 may output information about a route from a current location to a destination and may output route guidance information, based on current location information, destination location information, and map information of the navigation information.

Herein, the navigation information may include the map information showing a predetermined area from the current location and the route guidance information. The route guidance information may include event information.

If the cruise control mode is selected, the user interface 130 may display the map information showing the predetermined range from the current location. If event information is generated, the user interface 130 may output road modeling information corresponding to the generated event information.

Herein, the road modeling information may include information about the state of a road from the current location to an event location, a vehicle emoticon, current speed information, information about a location at which coasting starts, event type information, and event location information.

The information about the state of the road may include road type information of the road, location information for each road type, and gradient information of the road. The road type information of the road may include a flat type, a curved type, a climbing type, and a descending type, and may further include information about a degree of curve, and gradient information of a climbing or descending type.

Also, if the cruise control mode is selected, the user interface 130 may further display navigation information from the current location to the destination.

The user interface 130 may include a second input 131 to receive information from the user, and a second display 132 to display information input by the user and information about a function being executed.

The user interface 130 may receive a driving mode through the second input 131, and may receive a target speed, a restoration command, and the like through the second input 131.

The user interface 130 may display the driving mode and the target speed through the second display 132. The user interface 130 may display a message inquiring about whether to restore speed, information informing that a speed control is impossible, and event information, through the second display 132. Also, the user interface 130 may display a current driving speed through the second display 132.

The user interface 130 may change the color of the second display 132 to thereby output information informing that a speed control is impossible, and to output brake control information.

Descriptions about the engine 142, the battery 143, the motor 144, and the generator 145 will be omitted (see the above description with reference to FIG. 4).

The lamp 117 may be at least one lamp of an emergency lamp and a brake lamp.

The lamp 117 may be turned on upon coasting.

The detector 160 may detect information about the state of the vehicle 100 for the cruise control mode.

The detector 160 may include a speed detector 161 to detect the driving speed of the vehicle 100, and to output the driving speed information corresponding to the detected driving speed. The detector 160 may also include a charged level detector 162 to detect a charged level of the battery 143, and to output charged level information corresponding to the charged level of the battery 143.

The speed detector 161 may include a wheel speed detector to detect the speed of the front, rear, left, and right wheels 141, or an acceleration detector to detect the acceleration of the vehicle 100, or both.

The charged level detector 162 may include at least one of a current detector to detect the current of the battery 143, and a voltage detector to detect the voltage of the battery 143, or both.

The voltage detector may detect a voltage at the output terminal of the battery 143.

If the cruise control mode and target speed are input, the controller 170 may control the operation of at least one of the engine 142 and the motor 144 based on the driving speed detected by the speed detector 161, so that the vehicle can travel steadily at the target speed.

The controller 170 may acquire current location information based on GPS information received by the communication module 172. While controlling the execution of the cruise control mode, the controller 170 may determine whether an event occurs, based on the current location information and the navigation information stored in the storage 171. The controller 170 may then create road modeling information based on map information and event information if it is determined that an event occurs and may control the output of the created road modeling information.

Also, if a distance between the location of the event and the current location is a reference distance, the controller 170 may determine that the event occurs.

The controller 170 may acquire information about a location at which the event occurs, based on the navigation information, and determine whether the current location is the location at which the event occurs, based on the current location information and the information about the location at which the event occurs.

Also, the information about the location at which the event occurs may be information about a location at which event information is to be generated, and may include event type information, event location information, and speed limit information.

The controller 170 may then control coasting based on the event information and the driving speed information.

The event information may include the event location information, the event type information, and the speed limit information.

Also, the map information may include location information of a road having a gradient, and gradient information of the road.

More specifically, the controller 170 may acquire coasting distance information based on the event information and the driving speed information, may acquire information about a location at which coasting starts, based on the coasting distance information and the event information, and may acquire speed detection location information and restoration location information based on the coasting distance information and the event location information.

Also, the controller 170 may include the current location information, the event location information, the location information of the location at which coasting starts, and the speed detection location information in the road modeling information.

The road modeling information is described with reference to FIGS. 5A and 5B, below.

Figure 5A:
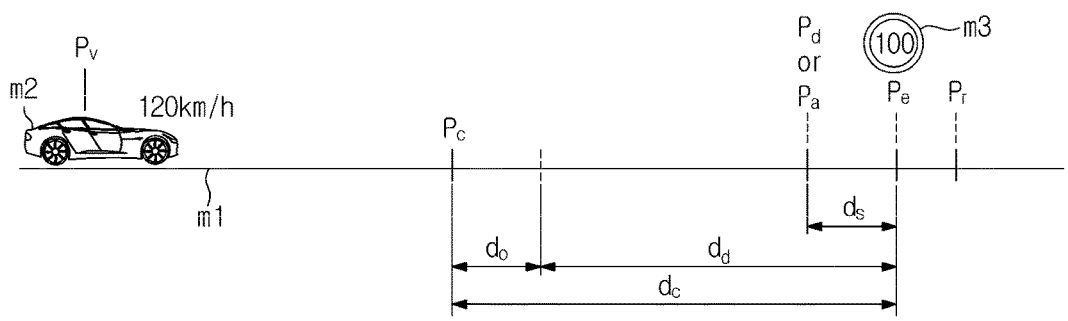
FIGS. 5A and 5B are road modeling information of a vehicle according to an embodiment of the present disclosure.

As shown in FIG. 5A, the road modeling information may include a graphic image m1 to which state information of a road from the generation location of an event to the location of the event is reflected. The road modeling information may also include a vehicle emoticon m2, current driving speed information (for example, 120 km/h or approximately 75 mph), current location information $P_v$ of the vehicle, information $P_c$ of a location at which coasting starts, event type information m3, event location information $P_e$, and speed detection location information $P_d$. The road modeling information may further include restoration location information $P_r$ for outputting information for restoring speed.

Herein, the speed detection location information $P_d$ may be information of a location at which it is determined whether the driving speed of the vehicle exceeds a speed limit.

The speed detection location information $P_d$ may be identical to speed maintenance information, information informing that a speed control is impossible, or alarm generation location information $P_a$ for outputting alarm information related to manual brake information.

The restoration location information $P_r$ may be identical to the event location information $P_e$.

Figure 5B:
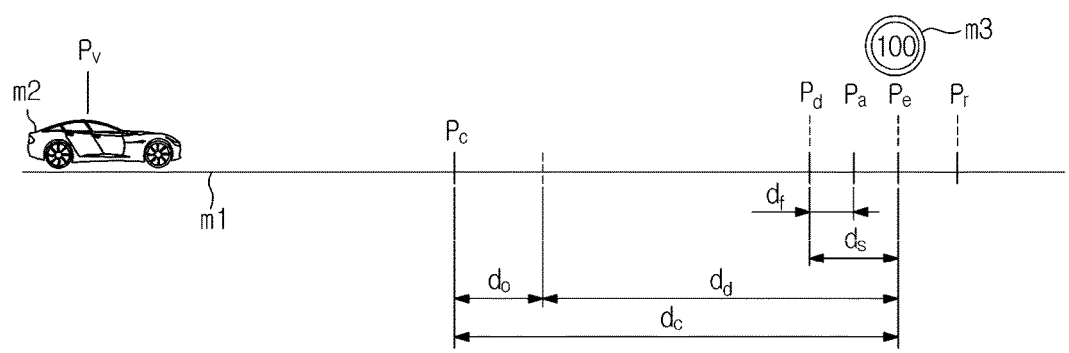

As shown in FIG. 5B, the alarm generation location information $P_a$ may include information of a location spaced at a predetermined distance $d_f$ apart from a speed detection location corresponding to the speed detection location information $P_d$.

The controller 170 may calculate a distance between the current location and the location of the event based on the current location information and the event location information of the road modeling information, and may determine whether the calculated distance is a coasting distance $d_c$. If the controller 170 determines that the calculated distance is the coasting distance $d_c$, the controller 170 may perform a control operation of stopping the operations of the engine 142 and the motor 144.

Herein, the coasting distance $d_c$ may include a predetermined distance $d_d$ corresponding to the driving speed of the vehicle and the gradient of the road, and may include an offset distance $d_o$.

The offset distance $d_o$ may be different for individual event information or for the gradients of roads. Or, the offset distance $d_o$ may be set to the same value regardless of the types of events and the gradients of roads.

As such, the controller 170 may control the operation of the generator 145 to charge the battery 143, while controlling coasting.

The controller 170 may control the operation of the lamp 117 so that the lamp 117 is turned on for a predetermined time period upon coasting.

The controller 170 may compare the current location information of the vehicle to the speed detection location information upon coasting, and if the controller 170 determines that the current location of the vehicle is the speed detection location, the controller 170 may compare detected driving speed information to the speed limit information of the event information. If the controller 170 determines that the detected driving speed is lower than or equal to the speed limit, the controller 170 may control the operation of at least one of the engine 142 and the motor 144 so that the vehicle can travel at the speed limit.

Herein, the speed detection location information $P_d$ may include information of a location spaced a predetermined distance $d_s$ apart from the location of the event.

If the controller 170 determines that the detected driving speed is higher than the speed limit, the controller 170 may control the output of information informing that a speed control is impossible, and control the output of manual manipulation request information for the brake apparatus.

If the controller 170 determines that the detected driving speed is higher than the speed limit when the current location of the vehicle is the speed detection location, the controller 170 may determine whether a speed control is impossible, based on a charged level of the battery 143 detected by the charged level detector 162.

The controller 170 may check a charged level of the battery 143. If the controller 170 determines that the charged level of the battery 143 is lower than a predetermined charged level, the controller 170 may control the output of the information informing that speed control is impossible, and may control the output of the manual manipulation request information for the brake apparatus. If the controller 170 determines that the charged level of the battery 143 is higher than or equal to the predetermined charged level, the controller 170 may control the operation of the motor 144 to reduce the driving speed of the vehicle.

Also, the controller 170 may acquire a charged level of the battery 143, based on information of at least one of the voltage and current of the battery 143.

The configuration of the controller 170 of acquiring the charged level of the battery 143 is described as an example, below.

For example, the controller 170 may check a detected voltage of the battery 143, and acquire a charged level of the battery 143 based on the voltage of the battery 143.

According to another example, the controller 170 may check a detected input current of the battery 143 and a detected output current of the battery 143, and integrate the input current and the output current with respect to time to thereby acquire a charged level of the battery 143.

According to another example, the controller 170 may acquire a charged level of the battery 143 based on a detected current of the battery 143 and a detected voltage of the battery 143.

The controller 170 may correct the charged level of the battery 143 based on a detected temperature of the battery 143.

The controller 170 determines whether the vehicle has passed through the location of the event, based on the current location information and the event location information, and if the controller 170 determines that the vehicle has passed through the location of the event, the controller 170 may control the output of information inquiring about whether to restore speed.

The controller 170 may compare the current location information to the restoration location information, and if the controller 170 determines that the current location is the restoration location, the controller 170 may control the output of information inquiring about whether to restore speed.

If a restoration command is input, the controller 170 may control the operation of at least one of the engine 142 and the motor 144 so that a driving speed reaches the target speed, and if no restoration command is input, the controller 170 may control the operation of at least one of the engine 142 and the motor 144 so that the driving speed of the vehicle is maintained at the detected driving speed.

The controller 170 may be an Electronic Control Unit (ECU) of controlling the driving of the vehicle, or may be any one of a micro-computer, a CPU, and a processor.

The controller 170 may be implemented with memory (not shown) to store data for algorithms for controlling the operations of components in the vehicle or programs for executing the algorithms, and a processor (not shown) to perform the above-described operations using the data stored in the memory. The memory and the processor may be implemented as separate chips, or integrated into a single chip.

The storage 171 may store map information and location-based event information of the navigation information.

Herein, the event information may include location information of roads requiring speed control, and speed limit information of the roads.

For example, the event information may include information about the locations of roads having speed limits, speed limit information of the roads, information about the locations of descending roads, information about the locations of curves, information about the locations of children protection zones, information about the locations of tollgates, and information about the locations of speed bumps.

Also, the information about the locations of descending roads may be information about the locations of roads having gradients at which coasting is impossible, and may be information about the locations of roads on which a driver needs to decelerate and put on the brakes manually before the vehicle enters the roads.

The information about the locations of curves may be information about the locations of roads having a predetermined curvature or more, and may be information about the locations of roads on which a driver needs to decelerate.

Also, the map information may include gradient information for each location on the map.

The controller 170 may control the operations of the clutch 147, the power converter 146, the crank shaft 142a, and the differential device 149, as well as the motor 144, the engine 142, the generator 145, and the battery 143, upon cruise control and coasting.

If updated navigation information is received through the communication module 172, the controller 170 may control update of the navigation information stored in the storage 171, based on the received navigation information.

While the cruise control mode is performed, the controller 170 may receive manipulation information for the steering wheel 151 and the brake pedal 152, and control the driving direction of the vehicle and the brake of the vehicle, based on the received manipulation information.

The storage 171 may store coasting distance information for each driving speed.

The storage 171 may store the coasting distance information for each driving speed and for each gradient.

Figure 6:
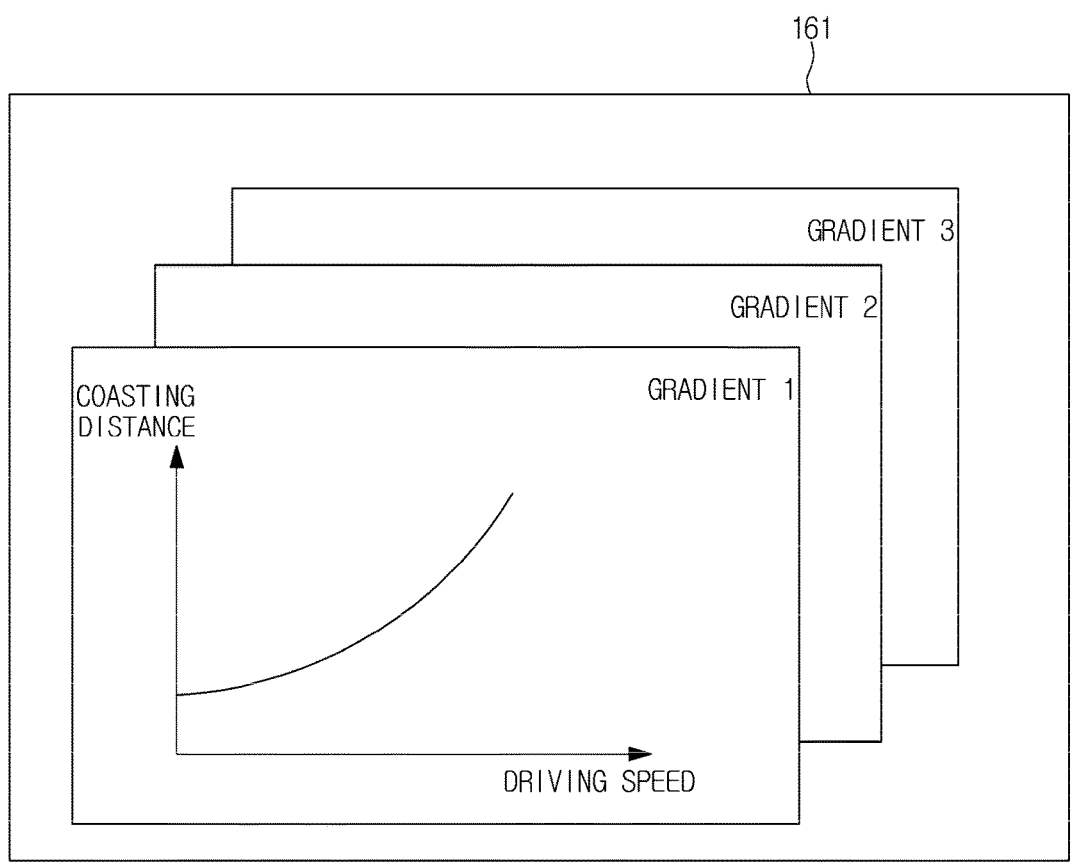
FIG. 6 is a representation of coasting distance information that corresponds to a plurality of driving speed information for each gradient of a vehicle according to an embodiment of the present disclosure.

As shown in FIG. 6, the storage 171 may store data in which the coasting distance information corresponds to a plurality of driving speed information for each gradient.

The data may be predetermined information, and may be information acquired by a test.

The storage 171 may further store gradient information of descending roads on which coasting is impossible.

The storage 171 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, such as Hard Disk Drive (HDD) and Compact Disc Read Only Memory (CD-ROM), although not limited to these.

The storage 171 may be a memory implemented as a separate chip from the processor described above in regard of the controller 170, or the storage 171 and the processor may be integrated into a single chip.

The communication module 172 may include a GPS receiver to communicate with a plurality of satellites to acquire current location information, and to transmit GPS to the controller 170, and a communication interface to enable wired and wireless communication, and to communicate with at least one of an external device and a server.

The external device may be a user terminal or storage medium, and may include a smart phone, a tablet PC, a laptop computer, a USB memory, and the like.

In other words, the communication module 172 may receive updated navigation information by communicating with at least one of the terminal 200 and the server 300.

Figure 7A:
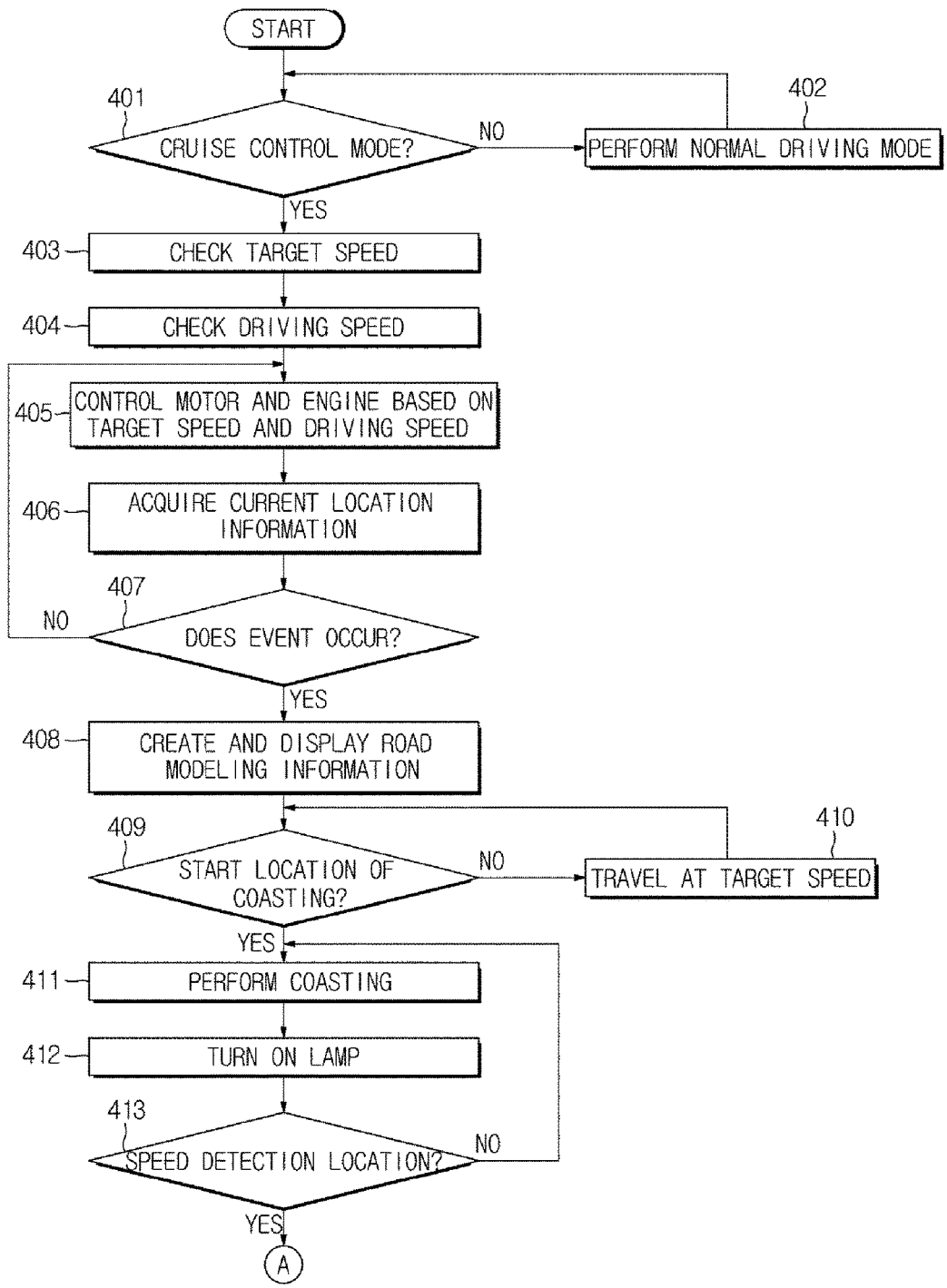
FIGS. 7A and 7B are control flowcharts of a vehicle according to an embodiment of the present disclosure.
Figure 7B:
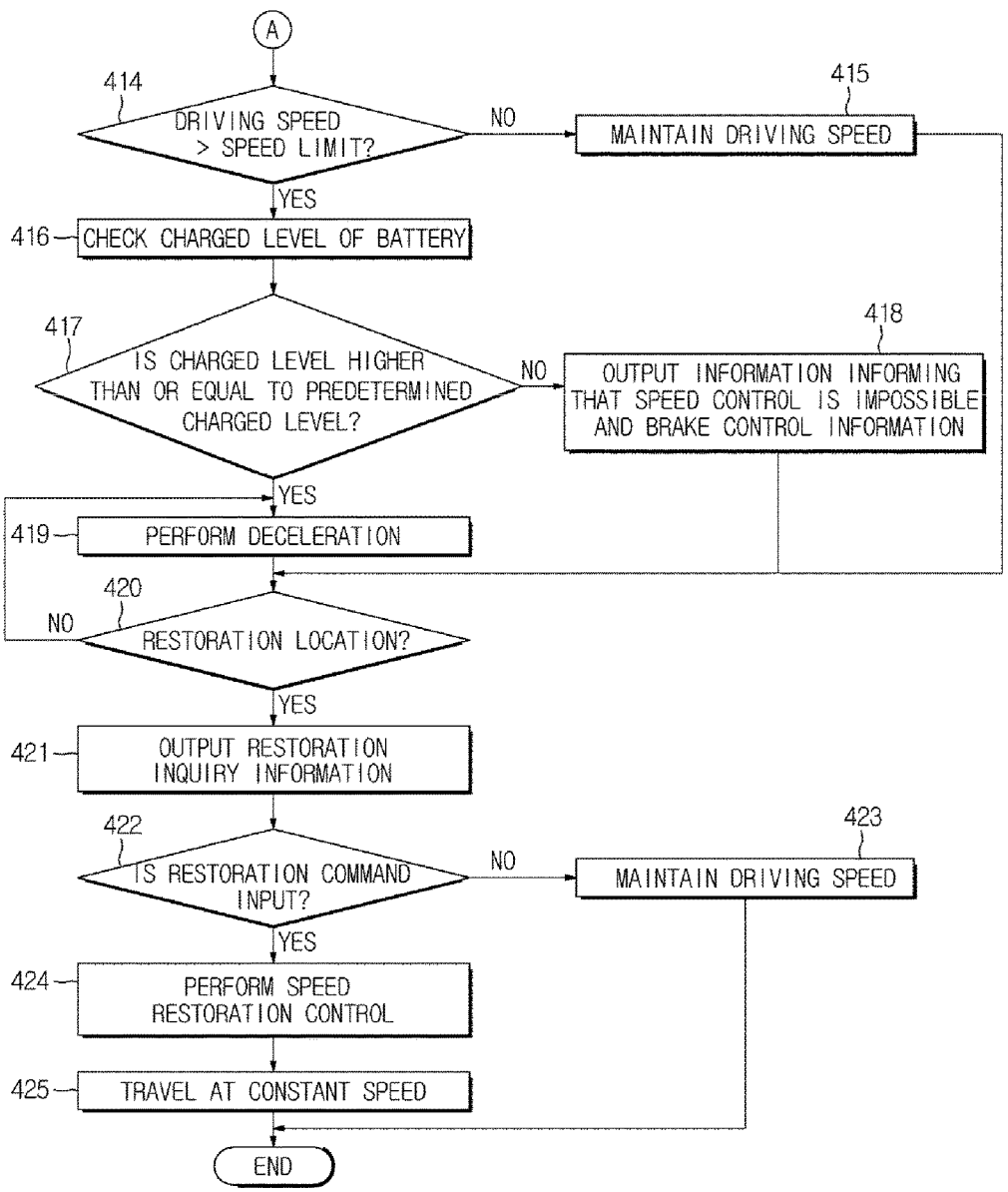

FIGS. 7A and 7B are control flowcharts of a vehicle according to an embodiment of the present disclosure.

If the starter 126 is turned on, the vehicle may control driving of the motor 144 to start.

If it is winter (i.e., if the outdoor temperature is lower than a predetermined temperature), or if the charged level of the battery 143 is lower than a reference charged level, the vehicle may operate the generator 145 to start through the engine 142.

If an acceleration command is input by a pressure applied on the accelerator pedal 153, the vehicle 100 may operate the engine 142 and the clutch 147 to increase speed.

If the vehicle travels at a predetermined speed or more, the vehicle may operate at least one of the engine 142 and the motor 144 to adjust the driving speed. If the vehicle travels at the predetermined speed or less, the vehicle may operate the motor 144 to adjust the driving speed. If a deceleration command or a brake command is input by the pressure applied on the brake pedal 152, the vehicle 100 may perform regenerative braking.

If the brake pedal 152 is pressed, the oil pressure of a master cylinder (not shown) may be detected by a pressure sensor. Then, the vehicle may calculate a target brake force based on the detected pressure, check a rotatory force corresponding to a part of the target brake force, and perform regenerative braking based on the rotatory force.

In other words, the target brake force may be generated by regenerative braking and the brake apparatus.

At this time, the vehicle may operate the generator 145 to charge the battery 143.

Then, when the vehicle stops, the vehicle may stop operating the motor 144 and the engine 142.

In other words, the vehicle may determine whether the driving mode is a cruise control mode, in operation 401. If the vehicle determines that the driving mode is a normal driving mode, not the cruise control mode, the vehicle may operate the power apparatus, such as the engine 142, the motor 144, the clutch 147, the battery 143, and the generator 145, based on a driver's manipulation of pressing the accelerator pedal or the brake pedal, to thus perform normal driving, in operation 402.

In other words, the determination on whether the driving mode is the cruise control mode may include an operation of determining whether a signal for selecting the cruise control mode is input through the first input 127 or the second input 131.

If the vehicle determines that the driving mode is the cruise control mode, the vehicle may check a target speed input to the first input 127 or the second input 131, in operation 403.

The vehicle may check the driving speed detected by the speed detector 161, in operation 404, and may control the operation of at least one of the engine 142 and the motor 144 based on the target speed and the driving speed to travel steadily at the target speed, in operation 405.

As such, the vehicle may acquire current location information based on GPS information received by the communication module 172, while controlling the cruise control mode, in operation 406.

The vehicle may determine whether an event occurs, based on the current location information and navigation information stored in the storage 171.

More specifically, if the cruise control mode is input, the vehicle may check current location information and destination location information. The vehicle may then create path information based on the current location information, the destination location information, and map information of the navigation information, and acquire event information included in the path based on the path information.

Herein, the event information may include the event location information, the event type information, and the speed limit information.

Also, the vehicle may determine whether an event occurs, based on the current location information and the event location information of the event information, in operation 407.

More specifically, the vehicle may calculate a distance between the current location and the location of the event, based on the event location information of the event information and the current location information. If the vehicle determines that the calculated distance is a reference distance, the vehicle may determine that an event occurs.

Then, if the vehicle determines that an event occurs, the vehicle may output event occurrence information, acquire road state information based on the map information of the path information and the event information, create road modeling information based on the road state information and the event information, and control the output of the road modeling information.

Also, the vehicle may acquire state information of a road located between the current location and the location of the event, based on the current location information, the event location information, and the map information of the navigation information.

Herein, the map information may include location-based state information of roads included in the path information.

The state information of the roads may include location-based gradient information of the roads.

In other words, if the vehicle determines that an event occurs, the vehicle may check the location-based gradient information of the roads from the current location to the location of the event. The vehicle may check the driving speed information detected by the speed detector 161. The vehicle may then create road modeling information based on the driving speed information, the gradient information of the roads, the event type information, the event location information, and the speed limit information, and display the road modeling information through the user interface 130, in operation 408.

Herein, the detected driving speed may be the target speed. Accordingly, the vehicle may omit an operation of detecting the driving speed.

The vehicle may perform coasting based on the driving speed information, the gradient information of the road, the event type information, the event location information, and the speed limit information.

More specifically, the vehicle may acquire coasting distance information based on information stored in the storage, the event information, and the driving speed information. The vehicle may acquire information of a location at which coasting starts based on the coasting distance information and the event location information.

Also, the vehicle may acquire speed detection location information and restoration location information, based on the coasting distance information and the event location information.

The vehicle may include the current location information, the event location information, the information of the location at which coasting starts, and the speed detection location information in the road modeling information, and may display the road modeling information.

A configuration for creating road modeling information for each event type, and acquiring various information is described with reference to FIGS. 8-15 below.

Figure 8:
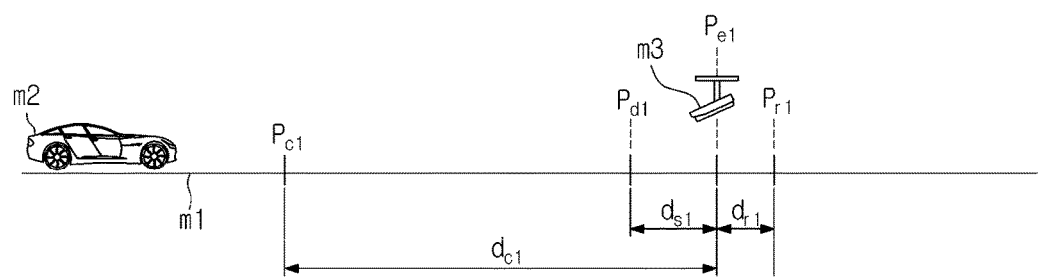
FIG. 8 is a view for describing an example of creating road modeling information, and acquiring various information, when an event type is speed violation monitoring.

FIG. 8 is a view for describing an example of creating road modeling information, and acquiring various information, when an event type is speed violation monitoring.

If an event occurs, the vehicle may recognize information of the event, and create and display road modeling information based on the event information and the current location information.

The vehicle may acquire an event type, an event location, and speed limit information from the event information. The vehicle may acquire road state information of a road on which the vehicle is currently traveling. More specifically, the vehicle may acquire the state information of a road from the current location to the event location, and include the acquired state information in the road modeling information.

In other words, the vehicle may acquire, as the event information, speed violation monitoring information, a speed limit of for example, 100 km/h (approximately 62 mph) and a location of speed violation monitoring.

As shown in FIG. 8, the road modeling information may include a graphic image m1 illustrating the state information of a road from the current location of the vehicle to a location $P_{e1}$ of speed violation monitoring. The road modeling information may include a vehicle emoticon m2 showing the relative current location of the vehicle with respect to a location $P_{e1}$ of the speed violation monitoring, and an event type information and a speed limit information m3 displayed at the location $P_{e1}$ of speed violation monitoring.

The vehicle may acquire coasting distance information $d_{c1}$ based on information stored in the storage 171, the speed limit information, and the road state information. The vehicle may then acquire start location information $P_{c1}$ of coasting based on the location information $P_{e1}$ of the speed violation monitoring and the coasting distance information $d_{c1}$. The vehicle may also acquire speed detection location information $P_{d1}$ based on the location information $P_{e1}$ of the speed violation monitoring and first distance information $d_{s1}$. The vehicle may then acquire restoration location information $P_{r1}$ based on the location information $P_{e1}$ of the speed violation monitoring and a second distance information $d_{r1}$, and may acquire alarm generation location information based on the speed detection location information $P_{d1}$.

Herein, the coasting distance information $d_{c1}$ may include predetermined distance information $d_d$ corresponding to the driving speed of the vehicle and the gradient of the road, and may include predetermined offset distance information $d_o$.

Also, the restoration location information $P_{r1}$ may be identical to the event location information $P_{e1}$.

The speed detection location information $P_{d1}$ may be used to output driving speed maintenance information for maintaining the driving speed of the vehicle if the driving speed of the vehicle is lower than the speed limit. The speed detection location information $P_{d1}$ may be used to output information informing that a speed control is impossible if the driving speed of the vehicle is higher than or equal to the speed limit. The speed detection location may be identical to an alarm output location $P_{a1}$ at which information instructing manual braking is output.

Figure 9:
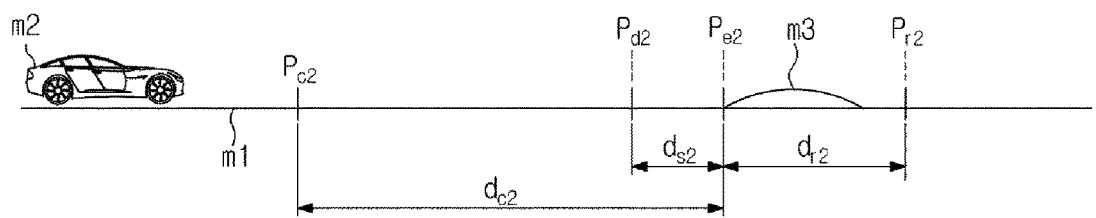
FIG. 9 is a view for describing an example of creating road modeling information, and acquiring various information, when an event type is a speed bump.

FIG. 9 is a view for describing an example of creating the road modeling information, and acquiring various information, when an event type is a speed bump.

The vehicle may acquire, as the event information, a speed bump, a speed limit of for example, 30 km/h (approximately 19 mph), and a location of the speed bump.

As shown in FIG. 9, the road modeling information may include a graphic image m1 illustrating the road state information of a road, a vehicle emoticon m2, and the event type information, and may include the speed limit information m3 displayed at a location $P_{e2}$ of a speed bump.

The vehicle may acquire the coasting distance information $d_{c2}$ based on information stored in the storage 171, the speed limit information, and the road state information. The vehicle may then acquire start location information $P_{c2}$ of coasting based on the location information $P_{e2}$ of the speed bump and the coasting distance information $d_{c2}$. The vehicle may also acquire speed detection location information $P_{d2}$ based on the location information $P_{e1}$ of the speed bump and a first distance information $d_{s2}$. The vehicle may acquire restoration location information $P_{r2}$ based on the location information $P_{e2}$ of the speed bump and second distance information $d_{r2}$ and may acquire alarm generation location information based on the speed detection location information $P_{d2}$.

Figure 10:
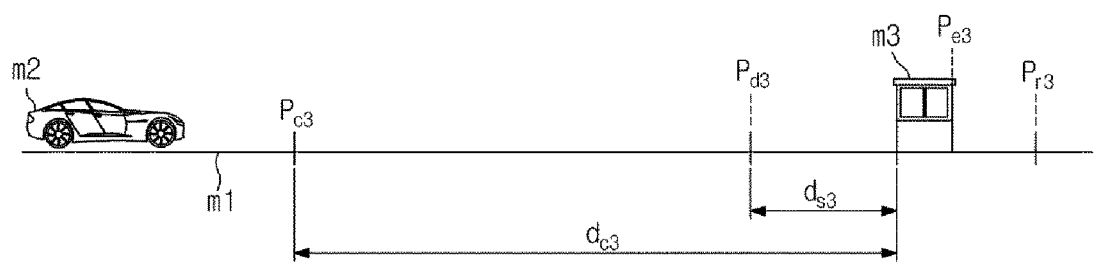
FIG. 10 is a view for describing an example of acquiring road modeling information, and acquiring various information, when an event type is a tollgate.

FIG. 10 is a view for describing an example of acquiring road modeling information, and acquiring various information, when an event type is a tollgate.

The vehicle may acquire, as the event information, a tollgate, a speed limit of for example, 30 km/h (approximately 19 mph) if a hi-pass apparatus is installed therein, and a location of the speed bump.

The vehicle may recognize a speed limit of 0 km/h (0 mph) if no high-pass apparatus is installed therein.

As shown in FIG. 10, the road modeling information may include a graphic image m1 illustrating the state information of a road, a vehicle emoticon m2, and the event type information, and may include the speed limit information m3 displayed at a location $P_{e3}$ of a tollgate.

The vehicle may acquire coasting distance information $d_{c3}$ based on information stored in the storage 171, the speed limit information, and the road state information. The vehicle may acquire start location information $P_{c3}$ of coasting, speed detection location information $P_{d3}$, restoration location information $P_{r3}$, and alarm generation location information, based on the location information $P_{e3}$ of the tollgate, and the coasting distance information $d_{c3}$.

Figure 11:
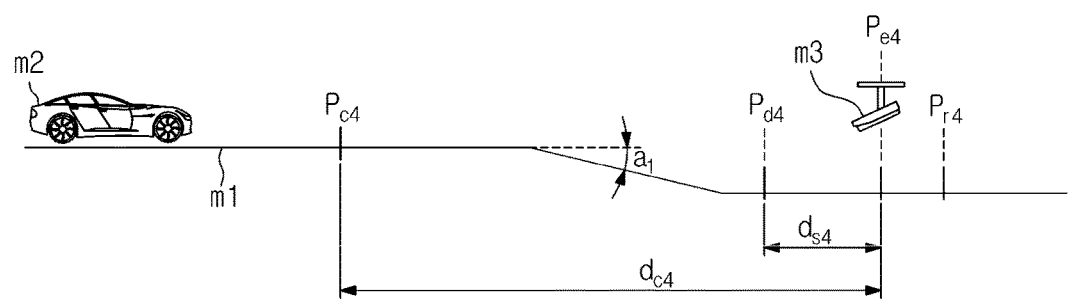
FIGS. 11 and 12 are views for describing an example of creating road modeling information, and acquiring various information, based on state information of a road.
Figure 12:
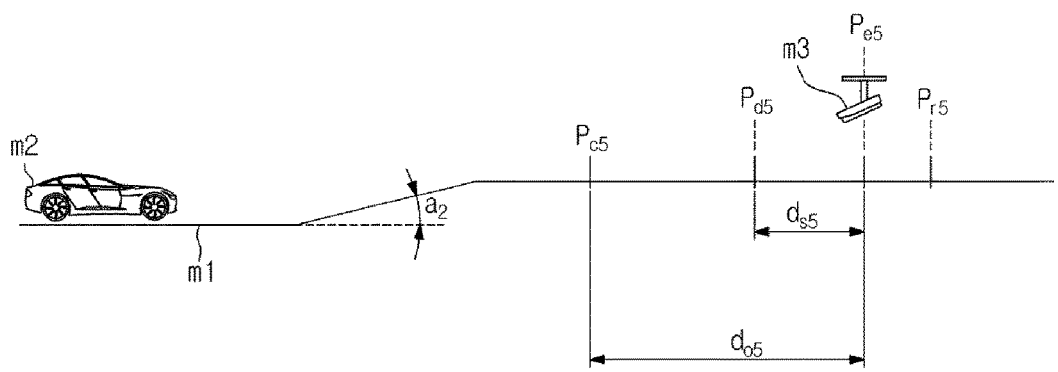

FIGS. 11 and 12 are views for describing an example of creating road modeling information, and acquiring various information, based on road state information of a road.

As shown in FIGS. 11 and 12, the coasting distance information may depend on the type of a road and the gradient of the road.

The type of the road may include a flat type, a climbing type, and a descending type. When the road is of a climbing type or of a descending type, the type of the road may include a gradient information of the road.

Information about the gradient of a road may include information about an angle of a climbing type road with respect to a road on which the vehicle is currently traveling.

As shown in FIG. 11, coasting distance information $P_{c4}$ may include a coasting distance corresponding to gradient information $a_1$ of a road.

In other words, a coasting distance for when a road is of a descending type may be longer than that for when a road is of a flat type.

Accordingly, the start location information $P_{c4}$ of coasting for when a road is of a descending type may be different from that for when a road is of a flat type. Also, speed detection location information $P_{d4}$, restoration location information $P_{r4}$, and predetermined distance information $d_{s4}$ for when a road is of a descending type may be identical to or different from those for when a road is a flat type.

Also, the coasting distance may be longer as the gradient $a_1$ of the descending road is greater, compared to when the road is of a flat type.

Also, the longer the length of a descending type road, the longer the coasting distance.

As shown in FIG. 12, coasting distance information $P_{c5}$ may include a coasting distance corresponding to the gradient information $a_2$ of a road.

In other words, a coasting distance for when a road is of a climbing type may be shorter than that for when a road is of a flat type.

Accordingly, the start location information $P_{c5}$ of coasting for when a road is of a climbing type may be different from that for when a road is of a flat type.

Also, speed detection location information $P_{d5}$, restoration location information $P_{r5}$, and predetermined distance information $d_{s5}$ for when a road is of a climbing type may be identical to or different from those for when a road is of a flat type.

Also, the coasting distance may be shorter as the gradient $a_2$ of the climbing road is greater, compared to when the road is of a flat type.

Also, the longer the length of a climbing type road, the shorter the coasting distance.

Figure 13:
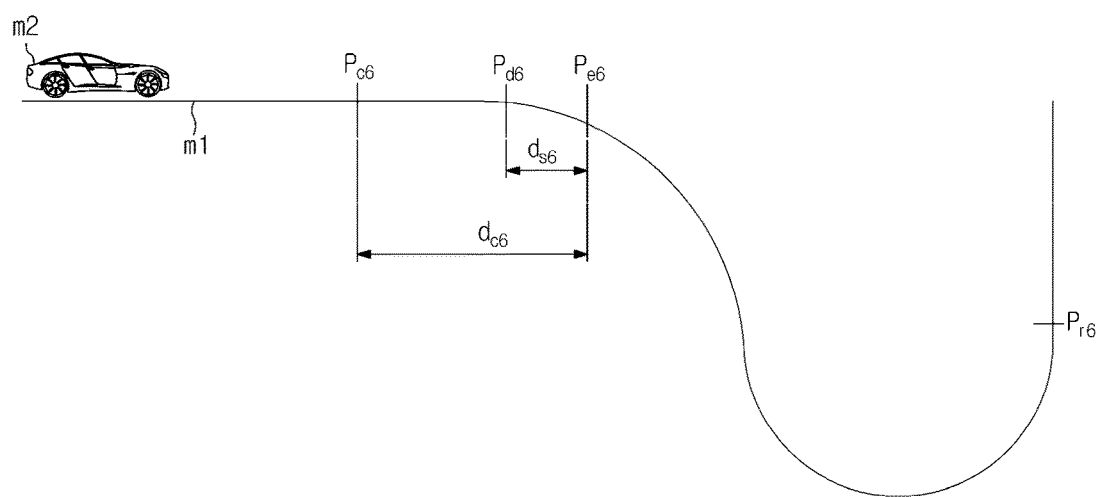
FIG. 13 is a view for describing an example of creating road modeling information, and acquiring various information, when an event type is a curved road.

FIG. 13 is a view for describing an example of creating road modeling information, and acquiring various information, when an event type is a curved road.

As shown in FIG. 13, the road modeling information may include a graphic image m1 illustrating the state information of a road and a vehicle emoticon m2. When an event type is a curved road, the curved road may be represented as a graphic image m1, and no separate emoticon corresponding to the event may be created.

If the event type is a curved road, the vehicle may check entry location information $P_{e6}$ of the curved road, check the speed limit information of the curved road, and acquire coasting distance information $d_{c6}$ based on information stored in the storage 171, the speed limit information, the road state information, and the entry location information of the curved road. The vehicle may then acquire start location information $P_{c6}$ of coasting, speed detection location information $P_{d6}$, restoration location information $P_{r6}$, and alarm generation location information based on the entry location information $P_{e6}$ of the curved road, and the coasting distance information $d_{c6}$.

Figure 14:
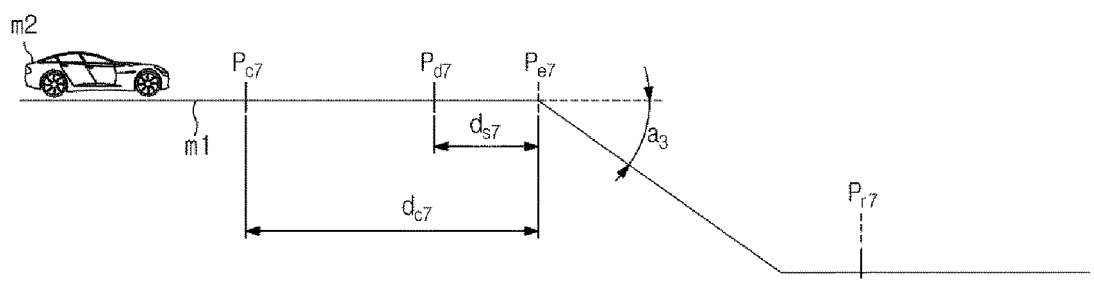
FIG. 14 is a view for describing an example of creating road modeling information, and acquiring various information, when an event type is a descending road on which coasting is impossible.

FIG. 14 is a view for describing an example of creating road modeling information, and acquiring various information, when an event type is a descending road on which coasting is impossible.

As shown in FIG. 14, the road modeling information may include a graphic image m1 illustrating road state information of a road and a vehicle emoticon m2.

If an event type is a descending road on which coasting is impossible, the vehicle may check entry location information $P_{e7}$ of the descending road. The vehicle may then acquire coasting distance information $d_{c7}$ based on information stored in the storage 171, driving speed information, and the entry location information of the descending road. The vehicle may also acquire start location information $P_{c7}$ of coasting, speed detection location information $P_{d7}$, and alarm generation location information based on the entry location information $P_{e7}$ of the descending road and the coasting distance information.

The vehicle may check end location information of the descending road and acquire restoration location information $P_{r7}$ based on the end location information of the descending road.

Herein, the descending road on which coasting is impossible may include a descending road inclined at an angle that is higher than or equal to a predetermined angle $a_3$.

Also, if the vehicle is located on the descending road, the vehicle may output information for a braking command.

Figure 15:
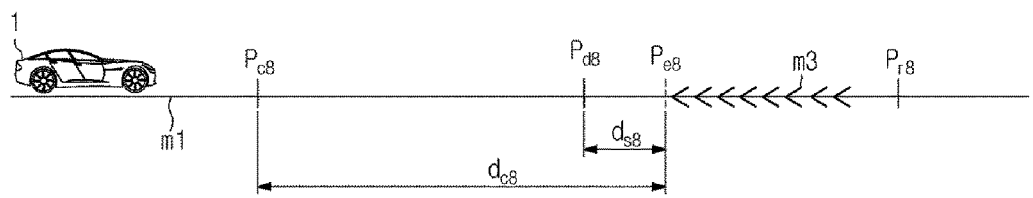
FIG. 15 is a view for describing an example of creating road modeling information, and acquiring various information, when an event type is a children protection zone.

FIG. 15 is a view for describing an example of creating road modeling information, and acquiring various information, when an event type is a children protection zone.

As shown in FIG. 15, the road modeling information may include a graphic image m1 illustrating the road state information of a road belonging to a children protection zone, a vehicle emoticon m2, and information m3 of the children protection zone.

If the event type is a children protection zone, the vehicle may check entry location information $P_{e8}$ of the children protection zone, and end location information of the children protection zone. The vehicle may then acquire coasting distance information $d_{c8}$ based on information stored in the storage 171, driving speed information, speed limit information, and the entry location information $P_{e8}$ of the children protection zone. The vehicle may further acquire start location information $P_{c8}$ of coasting, speed detection location information $P_{d8}$, and alarm generation location information based on the entry location information $P_{e8}$ and the coasting distance information. The vehicle may also acquire restoration location information $P_{r8}$ based on the end location information of the children protection zone.

Also, if the vehicle is located in the children protection zone, the vehicle may output information for a deceleration command.

Referring again to FIGS. 7A and 7B, the vehicle may check the current location information and the start location information of coasting of the road modeling information to determine whether the current location is the start location of coasting, in operation 409. If the vehicle determines that the current location is not the start location of coasting, the vehicle may continue to travel at a target speed in operation 410. If the vehicle determines that the current location is the start location of coasting, the vehicle may stop operating the engine 142 and the motor 144 to perform coasting, in operation 411.

Also, the vehicle may calculate a distance between the current location and the event location based on the current location information and the event location information of the road modeling information, to determine whether the calculated distance is the coasting distance $d_{c8}$. If the vehicle determines that the calculated distance is the coasting distance $d_{c8}$, the vehicle may stop operating the engine 142 and the motor 144 to perform coasting.

The vehicle may turn on a lamp for a predetermined time upon coasting, in operation 412, so that another vehicle following the vehicle can recognize that the vehicle is decelerating. The lamp may be at least one of an emergency lamp and a brake lamp.

Also, the vehicle may control the operation of the generator 145 while controlling coasting, to thereby charge the battery 143.

The vehicle may compare the current location information to the speed detection location information upon coasting. If the vehicle determines in operation 413 that the current location is the speed detection location, the vehicle may compare the detected driving speed to the speed limit information of the event information to determine whether the driving speed is higher than the speed limit, in operation 414. If the vehicle determines that the driving speed is lower than or equal to the speed limit, the vehicle may control the operation of at least one of the engine 142 and the motor 144 to continue to travel at the current driving speed, in operation 415.

Also, the vehicle may display speed maintenance information of the current driving speed through the user interface.

If the vehicle determines that the detected driving speed is higher than the speed limit, the vehicle may check information about a charged level of the battery 143 detected by the charged level detector 162, in operation 416. The vehicle may then compare the information about the charged level to predetermined charged level information to determine whether the charged level of the battery 143 is higher than or equal to the predetermined charged level, in operation 417.

If the vehicle determines that the charged level of the battery 143 is lower than the predetermined charged level, the vehicle may output information informing that a speed control is impossible, and may output brake control information, in operation 418.

If the vehicle determines that the charged level of the battery 143 is higher than or equal to the predetermined charged level, the vehicle may control the operation of the motor 144 to perform deceleration, in operation 419.

The deceleration may be performed to reduce the current driving speed.

Also, if the vehicle is an internal-combustion engine vehicle, the vehicle may output information informing that the speed control is impossible, and may output the brake control information, if the detected driving speed is higher than the speed limit.

The vehicle may compare the current location information to the restoration location information. If the vehicle determines in operation 420 that the current location is the restoration location, the vehicle may output restoration inquiry information for inquiring about whether to restore speed, in operation 421.

Also, the vehicle may compare the current location information to the event location information to determine whether the vehicle has passed through the event location. If the vehicle determines that the vehicle has passed through the event location, the vehicle may output information for inquiring about whether to restore speed.

The vehicle may determine whether a restoration command is input, in operation 422. If the vehicle determines that no restoration command is input for a predetermined time period, the vehicle may continue to travel at the current driving speed, in operation 423.

Also, if the vehicle determines that a restoration cancellation command is input, the vehicle may continue to travel at the current driving speed.

If the vehicle determines that a restoration command is input, the vehicle may control the operation of at least one of the engine 142 and the motor 144, and perform a speed restoration control so that the detected driving speed reaches a target speed, in operation 424.

If the vehicle determines that the driving speed detected by the speed detector is the target speed, the vehicle may travel steadily at the target speed, in operation 425.

The present disclosure can improve a driver's convenience and satisfaction.

According to the embodiments of the present disclosure, by enabling the vehicle to travel at a target speed using the speed sensor and the user interface, which is installed in the vehicle and capable of performing a navigation function, it is possible to reduce the manufacturing cost of the vehicle, resulting in a reduction of the cost burden for consumers.

In other words, it is possible to provide consumers with a low-price vehicle having a cruise function.

Also, by enabling the vehicle to perform coasting by controlling a driving force based on navigation information and driving speed information when the vehicle travels at a target speed, it is possible to improve fuel efficiency.

Also, in the case of a vehicle having a motor and a battery, it is possible to increase fuel efficiency and enhance the charged level of the battery through coasting.

Also, by outputting information informing that speed control is impossible when the driving speed cannot be reduced due to coasting so that a user can recognize that a speed control is impossible, the user can himself/herself control the speed of the vehicle, resulting in an improvement of driving safety and a reduction of accident rates.

Accordingly, it is possible to improve the quality and marketability of the vehicle through coasting, thereby increasing user satisfaction and ensuring product competitiveness.

Although a few embodiments of the present disclosure have been shown and described herein, it will be appreciated by those skilled in the art that changes may be made to the disclosed embodiments without departing from the principles and spirit of the disclosure, the scope of which is defined in the claims and their equivalents.

What is claimed is:

1. A vehicle comprising:
   an input device configured to receive a cruise control mode;
   a storage configured to store navigation information;
   a communication module configured to receive current location information;
   a power apparatus configured to generate a driving force, and to adjust the generated driving force; and
   a controller configured to acquire, if the cruise control mode is input by the input device, event location information about a location at which an event occurs based on the navigation information stored in the storage, and to control an operation of the power apparatus based on the current location information received by the communication module and the event location information about the location at which the event occurs.

2. The vehicle according to claim 1, further comprising:
   a speed sensor configured to detect a driving speed and to output driving speed information corresponding to the detected driving speed,
   wherein the input device is disposed in at least one of a head unit and a center fascia, and receives target speed information, and
   wherein, the controller controls the operation of the power apparatus based on the driving speed information and the target speed information input by the input device.

3. The vehicle according to claim 1, further comprising a speed sensor configured to detect a driving speed and to output driving speed information corresponding to the detected driving speed,
   wherein, if a current location corresponding to the current location information is the location at which the event occurs, the controller checks event information, acquires coasting distance information based on the event information and the driving speed information, and stops the operation of the power apparatus based on the acquired coasting distance information to perform coasting.

4. The vehicle according to claim 3, wherein the event information includes at least one of event type information, the event location information, and speed limit information.

5. The vehicle according to claim 4, wherein the controller acquires state information of a road between the current location and the location at which the event occurs based on the current location information, the event location information, and the navigation information, and acquires the coasting distance information based on the state information of the road and the driving speed information.

6. The vehicle according to claim 5, wherein the state information of the road includes road type information of the road, location information for each road type, and gradient information of the road.

7. The vehicle according to claim 4, wherein the controller determines whether the vehicle has passed through the location at which the event occurs based on the current location information and the event location information, controls an output of restoration information for restoring speed if the controller determines that the vehicle has passed through the location at which the event occurs, and controls the power apparatus based on the target speed information and the driving speed information if a restoration command is input by the input device.

8. The vehicle according to claim 4, wherein the controller determines whether the current location is at a predetermined distance ahead of the location at which the event occurs based on the current location information and the event location information, and, if the controller determines that the current location is at the predetermined distance ahead of the location at which the event occurs, the controller controls an output of brake information based on the driving speed information and the speed limit information.

9. The vehicle according to claim 8, further comprising a display,
wherein the power apparatus comprises an engine configured to drive wheels, and
wherein the controller determines whether the driving speed is higher than a speed limit, based on the driving speed information and the speed limit information, controls the display to display the brake information if the controller determines that the driving speed is higher than the speed limit, and controls the power apparatus to maintain the driving speed if the controller determines that the driving speed is lower than or equal to the speed limit.

10. The vehicle according to claim 8, further comprising a charged level detector configured to detect a charged level of a battery and to output charged level information corresponding to the charged level of the battery,
wherein the power apparatus comprises the battery, and a motor configured to drive wheels using a power of the battery, and
wherein the controller determines whether the driving speed is higher than a speed limit, based on the driving speed information and the speed limit information, and, if the controller determines that the driving speed is higher than the speed limit, the controller controls an operation of the motor based on the charged level information of the battery and predetermined charged level information.

11. The vehicle according to claim 10, further comprising a display,
wherein the controller determines whether the charged level of the battery is higher than or equal to the predetermined charged level, based on the charged level information of the battery and the predetermined charged level information, and, if the controller determines that the charged level of the battery is lower than the predetermined charged level, the controller controls the display to display the brake information.

12. The vehicle according to claim 11, wherein, if the controller determines that the driving speed is lower than or equal to the speed limit, the controller controls the power apparatus to maintain the driving speed.

13. The vehicle according to claim 3, wherein the controller acquires restoration location information based on the event location information, and controls an output of restoration information for restoring speed based on the restoration location information.

14. A method of controlling a vehicle, the method comprising:
if a cruise control mode is input by an input device, checking driving speed information detected by a speed sensor and target speed information input by an input device;
controlling an operation of a power apparatus based on the driving speed information and the target speed information,
determining whether an event occurs, based on pre-stored navigation information and current location information received by a communication module; and
if it is determined that the event occurs, controlling the operation of the power apparatus based on the current location information, event information of the event, and the driving speed information to perform a coasting; and
turning on a lamp if the coasting is performed.

15. The method according to claim 14, wherein the event information includes at least one of event type information, event location information corresponding to a location at which the event occurs, and speed limit information, and
wherein the performing of the coasting comprises acquiring coasting distance information based on the event location information and the driving speed information, acquiring start location information of the coasting based on the coasting distance information and the event location information, and controlling the coasting based on the start location information of the coasting.

16. The method according to claim 15, wherein the performing of the coasting further comprises acquiring state information of a road between a current location corresponding to the current location information and the location at which the event occurs based on the navigation information, and acquiring the coasting distance information based on the state information of the road and the driving speed information,
wherein the state information of the road includes road type information of the road, location information for each road type, and gradient information of the road.

17. The method according to claim 14, further comprising:
acquiring restoration location information based on event location information of the event; and
controlling an output of restoration information for restoring speed based on the restoration location information.

18. The method according to claim 14, further comprising:
acquiring speed detection location information based on event location information of the event;
controlling detection of the driving speed information based on the speed detection location information and the current location information;
determining whether a driving speed is higher than a speed limit, based on the driving speed information and the speed limit information;

displaying brake information on a display, if it is determined that the driving speed is higher than the speed limit; and controlling the power apparatus to maintain the driving speed, if the driving speed is lower than or equal to the speed limit.

19. The method according to claim 18, wherein the displaying of the brake information on the display comprises:

determining whether a charged level of a battery is higher than or equal to a predetermined charged level, based on charged level information of the battery and predetermined charged level information, if it is determined that the driving speed is higher than the speed limit; and performing a deceleration control using a motor connected to wheels, if it is determined that the charged level of the battery is higher than or equal to the predetermined charged level; and displaying the brake information on the display, if it is determined that the charged level of the battery is lower than the predetermined charged level.

\* \* \* \* \*